United States Patent

[11] 3,548,921

| [72] | Inventor | George H. Butterfield<br>1220 SW. Stark St., Portland, Oreg. 97205 |
|---|---|---|
| [21] | Appl. No. | 768,292 |
| [22] | Filed | Oct. 17, 1968 |
| [45] | Patented | Dec. 22, 1970 |

[54] APPARATUS FOR MOLDING AN ARBOR TO A LENS
4 Claims, 7 Drawing Figs.

[52] U.S. Cl. ................................................. 164/304,
164/113, 164/136, 164/313, 164/317

[51] Int. Cl. ....................................................... B22d 17/04

[50] Field of Search........................................ 18/(Lens
Digest); 164/304, 310, 311, 312, 313, 316, 317,
113, 120, 136; 51/277

[56] References Cited
UNITED STATES PATENTS

| 1,717,254 | 6/1929 | Polak ............................ | 164/313 |
| 2,369,277 | 2/1945 | Campbell ..................... | 164/304 |
| 3,209,419 | 10/1965 | Deguchi et al................ | 164/304X |
| 3,304,586 | 2/1967 | Buckminster et al......... | 18/Lens Digest UX |
| 3,468,366 | 9/1969 | Suddarth...................... | 164/304X |

Primary Examiner—J. Spencer Overholser
Assistant Examiner—John E. Roethel
Attorney—James D. Givnan ABSTRACT: An apparatus for molding an arbor to a lens for machining and/or finishing the lens in final form. The apparatus is manually operable but functionally automatic in feeding a metered amount of arbor molding material in a fluid state into a mold in secure but removable engagement with either surface of the lens. The finished arbor is of solid formation and secured to the lens in axial alignment with the center of the lens.

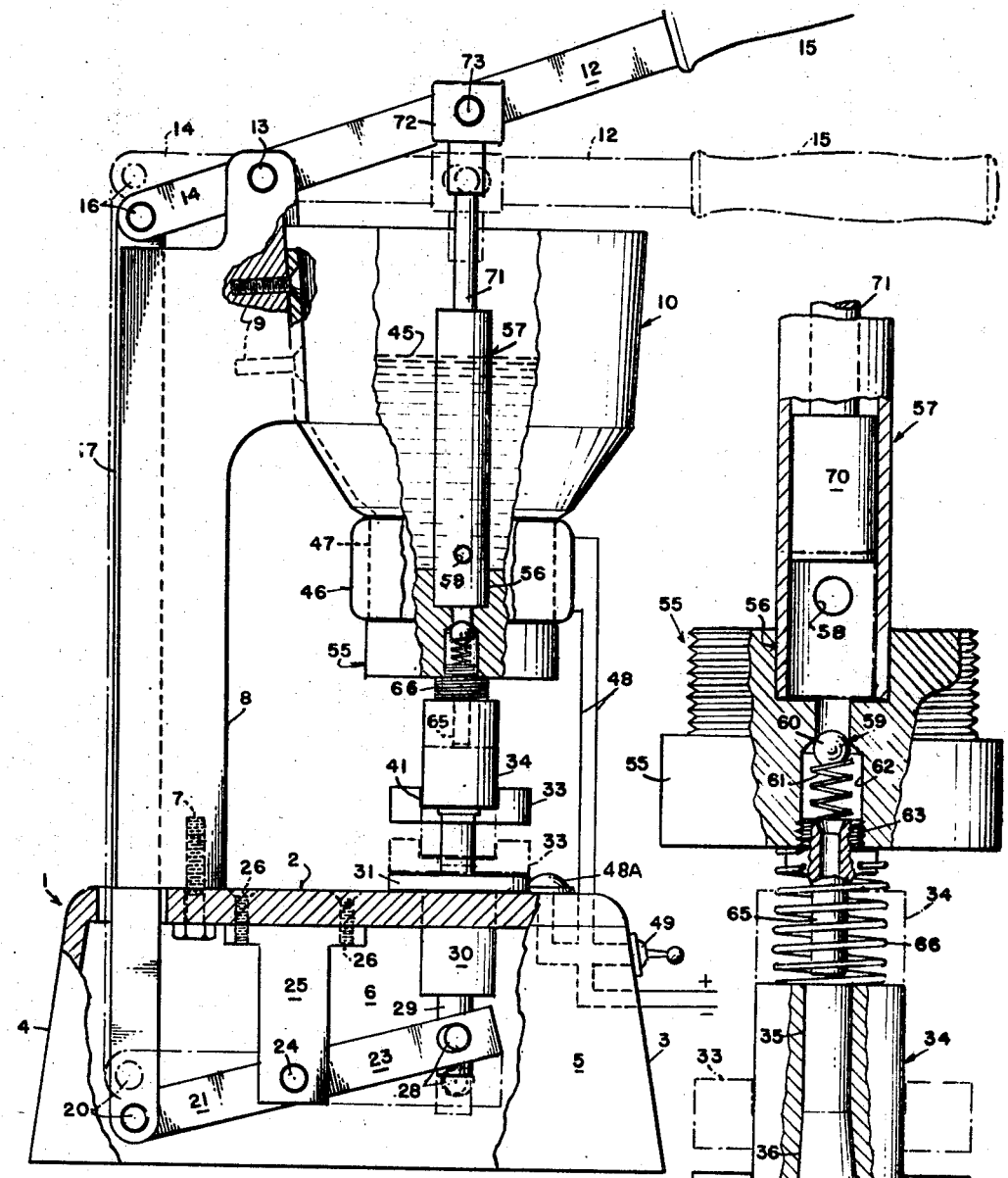
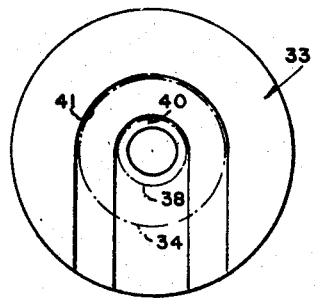
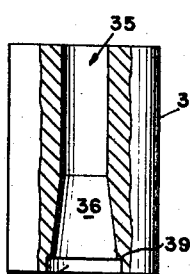
Fig. 1
Fig. 2
Fig. 3
Fig. 4
GEORGE H. BUTTERFIELD
INVENTOR.
BY James D. Girman
ATT'Y

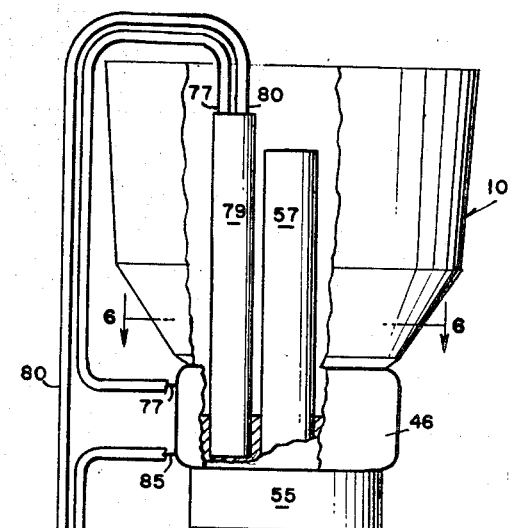
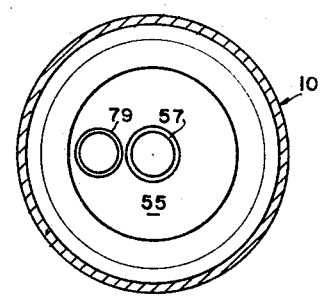
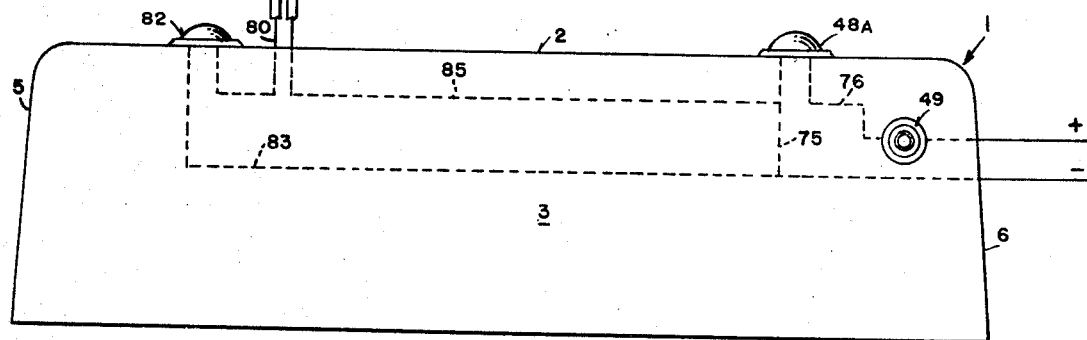
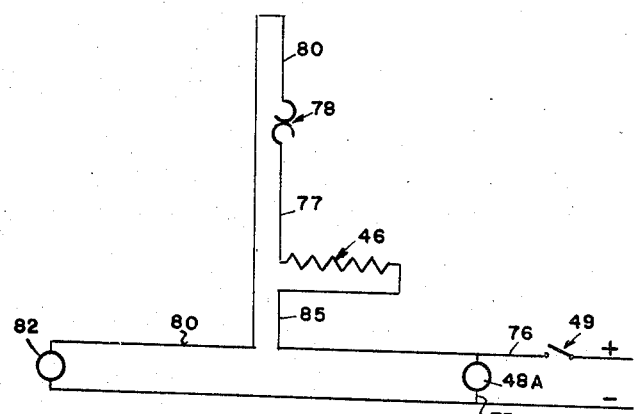
GEORGE H. BUTTERFIELD
INVENTOR.

3,548,921

APPARATUS FOR MOLDING AN ARBOR TO A LENS

The integrated arbor and lens herein disclosed does not prescribe any limits of utility of the invention since the finished product is typical of that shown in my copending application, Ser. No. 674,563, filed Oct. 11, 1967, now abandoned and exemplary of any such molded combination.

The embodiment of the invention herein shown and described is characterized by an arbor mold mounted upon a lever actuated supporting base for upward and downward movement relative to a valve-controlled discharge nozzle of a fixedly mounted crucible, or the like, containing a quantity of arbor-forming material in a molten plastic state.

One of the principal objects of the present invention is to provide molding apparatus of the character described wherein the extent of said upward and downward mold movement in relation to the discharge nozzle is such that the arbor material will accumulate by gradual buildup, under pressure, from the surface of a lens, fixedly held within the mold, to a predetermined height or desired length of arbor.

Another object of the invention is to provide molding apparatus as described above which is of simple, durable construction, efficient and positive in operation and capable of producing greater quantities of the molded product in a given period of time than any other method or apparatus I am aware of.

Another object is the provision of means for quickly, conveniently and firmly mounting the mold with its core and hence the lens concentrically in accurate alignment with the discharge nozzle of the crucible.

A further object is the provision of a heating coil or the like surrounding the bottom or discharge end of the crucible and in circuit with a source of electric current through a temperature-responsive switch to maintain a predetermined degree of temperature for causing free flow of the arbor material during the molding operation.

The foregoing and other objects and advantages which will become subsequently apparent reside in the details of construction and operation as more fully hereinafter described and claimed, reference being had to the accompanying drawing forming a part hereof and in which:

FIG. 1 is a side elevational view of molding apparatus made in accordance with my invention with fragments broken away to reveal internal parts.

FIG. 2 is a composite detail view on an enlarged scale with fragments broken away illustrating the mechanical and functional relation of the valve controlled outlet or discharge end of the crucible, the discharge nozzle, the mold, and elevator means for raising and lowering the mold relative to the nozzle.

FIG. 3 is a detail plan view of the lens and mold holding base operable by the elevator means.

FIG. 4 is an elevational view of the mold with a fragment broken away.

FIG. 5 is a front elevational view of FIG. 1 with some parts omitted and some in section showing a modified electric circuitry including in addition to a heating coil, a thermostatic switch and one signal light series connected in circuit with a source of electric current through a manually operable switch. Also shown is a second signal light connected in parallel with the current source through the manual switch.

FIG. 6 is a sectional top plan view taken approximately along the line 6—6 of FIG. 5.

FIG. 7 is the wiring diagram of FIG. 5 wherein it will be seen that failure of either the thermostatic switch or the heating coil will break the circuit to the one signal light and that the other signal light will continue to burn indicating that the source of current into the apparatus has not been interrupted.

With continuing reference to the drawings wherein like reference numerals designate like parts, the molding apparatus as shown in FIG. 1 comprises a hollow base indicated generally at 1 having a top wall 2, front wall 3, rear wall 4 and sidewalls 5 and 6.

Mounted upon the top wall 2 and secured thereto as at 7 is a standard 8 to whose top end is secured as at 9 a crucible 10 containing a quantity of arbor-forming material heated to a fluid state for molding purposes.

A first lever arm 12 is pivotally attached as at 13 to the top end of the standard 8 to provide a fulcrum for the load arm 14. The free end of arm 12 is provided with any suitable type of hand grip 15, and the end of load arm 14 is pivotally attached as at 16 to the top end of a link 17 whose bottom end is pivotally attached as at 20 to a second load arm 21 pivotally attached as at 24 to the bottom end of a bracket 25 to provide a second lever arm 23. Bracket 25 is secured as at 26 to the underside of the top wall 2 of the base 1 on the interior thereof.

The outer end of lever arm 23 is pivotally attached as at 28 to the bottom end of an elevator shaft 29 slidable through a vertical bearing 30 flanged as at 31 and thereat secured as at 32 (FIG. 2) to the top wall 2 of the base 1. The flanged top 31 of bearing 30 provides a seat for an elevator in the form of a disc 33 secured as at 33A to the top end of the elevator shaft 39. Disc 33 provides a seat for a mold indicated generally at 34, which —h is concentrically cored throughout its length as at 35.

The core of the mold is preferably provided with a protective coating, such as Teflon S or the like, for easy removal of a finished arbor from the mold.

The bottom portion of the core is flared outwardly as at 36 to a counterbore 37 (FIG. 4) for receiving and holding a lens 38 (FIG. 2) against an internal annular shoulder 39 with the bottom of the lens extending downwardly from the bottom of the mold, as shown, in seated engagement with a recess 40 in the elevator disc 33.

As best illustrated in FIG. 3, the recess 40 is concentric with a larger recess 41 and both recesses open outwardly as shown to provide convenient means for accurately placing and holding the mold 34 and lens 38 in axial alignment with the elevator shaft 29, the center of bearing 30 and elevator disc 33.

The crucible 10 contains a quantity of metal 45 normally maintained in a fluid or plastic state by a heating coil 46 or the like, surrounding the reduced cylindrical bottom end 47 of the crucible and in circuit as at 48 through a signal light 48A and a manually operable switch 49 with a source of electric current, not shown. This bottom end of the crucible is closed by either an externally threaded plug 55, or if desired by a plug which may be slid into securement by a forced fit. The center of the plug is bored as at 56 to rigidly support a cylinder 57 whose bottom end is in communication with the interior of the crucible through a port or inlet opening 58. The bottom end of cylinder 57 is in open communication with a seat 59 for a ball check valve 60 supported by a compression spring 61 within a cage or bore 62 internally threaded at its bottom end and closed by the threaded top end 63 of a nozzle 65. Nozzle 65 is surrounded by a compression spring 66 whose top end bears against the underside of the plug 55 with its opposite end bearing against the top of the mold 34 when the latter is seated within the elevator disc 33 with the lens 38 firmly held in the bottom of the mold against the internal annular shoulder 39 and ready for the molding operation.

Slidable within the cylinder 57 and cooperating with inlet port 58 is a piston 70 provided with a connecting rod 71 secured at its top end to a yoke 72 pivotally attached as at 73 to the first lever arm 12.

From the foregoing it will be apparent that upward movement of the piston 70 from its broken to full line position, by the lever 12, will open the inlet port 58 to allow flow of the molten material 45 from the crucible into the space between the ball check valve 60 and the bottom end of the now upwardly spaced piston 70. This predetermined amount of arbor material is thus trapped within the bottom end of the cylinder 57 until the piston 70 is moved downwardly to its broken line position by the lever 12. The resultant downward pressure applied to the trapped material will, of course, force the ball check valve 60 downwardly away from its seat 59 allowing the material 45 to flow forcefully through the bore 62 and nozzle 65 to completely fill the core 35 of the mold 34. During this same time interval the mold will be gradually lowered into the broken line position through the medium of the load arm 14 of lever 12, link 17 and load arm 21 of lever 23 and the elevator rod 29.

This simultaneous movement of piston and mold, i.e. the mold moves down slower than the piston due to the load arm 14 of lever 12 being of a shorter length than the load arm 21 of lever 23, will forcefully fill the mold core (35—36) with the arbor material under compression throughout the depth of the mold to insure solid arbor formation.

Throughout the entire operative range of the mold 34 and piston 70 the compression spring 66 will at all times maintain the mold 34 and lens 38 firmly seated in axial alignment within their respective recesses 41 and 40 in the elevated disc 33.

In the modified form of circuitry shown in FIGS. 5 and 7, the signal light 48A is parallel connected through wires 75—76 and switch 49 to the source of current. One side of the heating coil 46 is connected through wire 77 to one side of a high-limit thermal switch 78 (FIG. 7) disposed within a tubular housing 79 also vertically mounted within the crucible base plug 55 and extending upwardly through the molten plastic arbor material to partake of and control the temperature of the material. The other side of the thermal switch is connected as at 80 to one side of a second signal light 82. The other side of this signal light is connected by wire 83 to the other side of the source of current. The other side of heating coil 46 is connected through wires 85, 76 and switch 49 to the other side of the current source.

With the heating coil, thermal switch, and signal light 48A in multiple with the source it will be readily understood that when switch 49 is closed signal light 48A will burn continuously to indicate current flow into the apparatus regardless of the circuit beyond that light.

When the arbor material within the crucible 10 reaches a predetermined temperature the thermal switch will open and break the circuit to the other signal light 82, or the same would happen if any failure should occur in the thermal switch. Similarly, failure of the heating coil would also break the circuit to the second signal light 82. Thus, when this second signal light ceases to function the operator will be aware of the fact that although current is being fed into the apparatus the trouble lies within either the heating coil or the thermal switch.

I claim:

1. Apparatus for molding an arbor to a lens, said apparatus comprising:
   a base;
   a crucible mounted upon the base in elevated relation thereto and containing arbor forming material in a fluid state;
   a heating element associated with said crucible and in circuit with a source of electric current; a c
   a cylinder disposed within the crucible and having valved communication with the interior of the crucible;
   a discharge nozzle depending from said crucible and in valved communication with the interior of said cylinder;
   a piston slidable within said cylinder connected to and operable by lever means for controlling progressive flow of the arbor forming material from the crucible through said valved communication; crucible
   a mold-supporting base;
   a mold having a bore extending therethrough and opening into a lens-carrying counterbore;
   means mounting said bore and a lens within the counterbore upon and concentrically with said mold-supporting base; and
   lever arms interconnected at one of their ends and connected respectively intermediate their ends to said piston and to said mold-supporting base whereby movement of both of said levers in one direction will elevate the mold to receive said nozzle to a predetermined depth and simultaneously open communication between said cylinder and said nozzle to inject a metered amount of arbor forming material into the core of the mold and into adhesive engagement with the surface of said lens.

2. Apparatus as claimed in claim 1 wherein:
   said lever means comprises a lever attached to said piston and having a load arm of a given length; and
   a second lever arm attached to said mold supporting shaft and having a load arm of a length unlike that of said first load arm whereby movement of both of said load arms will lower said mold supporting shaft and said mold downwardly to a lesser extent than the downward movement of said piston to thereby effect maximum penetration of said nozzle into said core of the mold and thereby effect gradual pressurized buildup of said arbor-forming material within the mold.

3. Apparatus as claimed in claim 1, including;
   a high-limit thermal switch disposed within said crucible and responsive to the temperature of molten material within the crucible; and
   said thermal switch in circuit through said heating element, through a first signal light and a manual switch to one side of said current source.

4. Apparatus as claimed in claim 1, including:
   first and second signal lights;
   said heating element, thermal switch and said second signal light connected in series through said first signal light with said current source; and
   wherein said first signal light is connected in multiple with said current source whereby said first signal light will continue to burn in the event of failure of said heating element or the thermal switch or said second signal light.